US006309828B1

(12) United States Patent
Schleifer et al.

(10) Patent No.: US 6,309,828 B1
(45) Date of Patent: *Oct. 30, 2001

(54) METHOD AND APPARATUS FOR FABRICATING REPLICATE ARRAYS OF NUCLEIC ACID MOLECULES

(75) Inventors: Arthur Schleifer, Portola Valley; Michael P. Caren, Palo Alto; Leslie A. Leonard, Portola Valley; Charles Z. Hotz, San Mateo; Michel G. M. Perbost, Cupertino, all of CA (US)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,421

(22) Filed: Nov. 18, 1998

(51) Int. Cl.$^7$ .............................. C12Q 1/68; C12P 19/34; C07H 21/00; C12M 1/36

(52) U.S. Cl. .................. 435/6; 435/91.1; 435/287.8; 435/288.3; 435/288.4; 435/288.5; 435/288.6; 536/23.1; 536/25.3

(58) Field of Search ................................. 536/23.1, 25.3; 435/6, 91.1, 287.8, 288.3, 288.4, 288.5, 288.6

(56) References Cited

U.S. PATENT DOCUMENTS

| Re. 30,562 | 3/1981 | Park ....................... 435/296 |
| 4,304,865 | 12/1981 | O'Brien et al. ...................... 435/240 |
| 5,047,215 | 9/1991 | Manns .................... 422/101 |
| 5,108,704 | 4/1992 | Bowers et al. .......................... 422/70 |

(List continued on next page.)

FOREIGN PATENT DOCUMENTS

| 2536313 | 5/1984 | (FR) . |
| WO 95/35505 | 12/1995 | (WO) . |
| WO 97/15394 | 5/1997 | (WO) . |
| WO 97/19749 | 6/1997 | (WO) . |

OTHER PUBLICATIONS

Southern and Maskos, "Parallel synthesis and analysis of large numbers of related chemical compounds: apllications to oligonucleotides" Journal of Biotechnology, 35 (1994) 217–227.*

Stimpson et al. "Parallel Production of Oligonucleotide Arrays Using Membranes and Reagent Jet Printing" Bio-Techniques 25: 886–890 (1998).*

Ohlmeyer, Michael H.J. et al., "Complex synthetic chemical libraries indexed with molecular tags", Proc. Nat. Acad. Sci., USA, vol. 90, No. 23, pp. 10922–10926, 1993.

Klebe, Robert J., "Cytoscribing: A Method for Micropositioning Cells and the Construction of Two–and Three–Dimensional Synthetic Tissues", Experimental Cell Research, vol. 179, No. 2, pp. 362–373, 1988.

Primary Examiner—W. Gary Jones
Assistant Examiner—B J Forman (57) ABSTRACT

A method and apparatus for fabricating replicate arrays of nucleic acid molecules include the preparation of the molecules and the application the molecules onto a substrate in an ordered array. The apparatus comprises a synthesis unit and a plurality of outlets. The synthesis unit comprises a plurality of synthesis chambers that are spatially arranged relative to each other to provide an array suitable for conducting parallel nucleic acid syntheses. The chambers are suitable for containing discrete compositions of nucleic acid molecules. Each outlet of the plurality of outlets communicates with a single synthesis chamber. The plurality of outlets are configured such that nucleic acid molecules can be removed from the chambers through the outlet and deposited onto the substrate in an ordered array that corresponds to the spatial arrangement of the synthesis chambers.

29 Claims, 6 Drawing Sheets

U.S. PATENT DOCUMENTS

| | | | |
|---|---|---|---|
| 5,219,528 | 6/1993 | Clark | 422/101 |
| 5,324,483 | 6/1994 | Cody et al. | 422/131 |
| 5,368,823 | 11/1994 | McGraw et al. | 422/134 |
| 5,429,807 | 7/1995 | Matson et al. | 422/131 |
| 5,445,934 | 8/1995 | Fodor et al. | 435/6 |
| 5,472,672 | 12/1995 | Brennan | 422/131 |
| 5,474,796 | 12/1995 | Brennan | 427/2.13 |
| 5,529,756 | 6/1996 | Brennan | 422/131 |
| 5,529,899 | 6/1996 | Wheelock et al. | 435/6 |
| 5,545,531 | 8/1996 | Rava et al. | 435/6 |
| 5,565,173 | 10/1996 | DeWitt et al. | 422/131 |
| 5,567,391 | 10/1996 | DeWitt et al. | 422/131 |
| 5,582,801 | 12/1996 | DeWitt et al. | 422/131 |
| 5,593,642 | 1/1997 | DeWitt et al. | 422/131 |
| 5,601,979 | 2/1997 | Wong | 435/6 |
| 5,609,826 | 3/1997 | Cargill et al. | 422/99 |
| 5,612,002 | 3/1997 | Cody et al. | 422/131 |
| 5,620,663 | 4/1997 | Aysta et al. | 422/104 |
| 5,620,853 | 4/1997 | Smethers et al. | 435/6 |
| 5,624,815 | 4/1997 | Grant et al. | 435/30 |
| 5,658,802 * | 8/1997 | Hayes et al. | 435/518 |
| 5,700,637 | 12/1997 | Southern | 435/6 |
| 5,807,522 | 9/1998 | Brown et al. | 422/50 |
| 6,083,763 * | 7/2000 | Balch et al. | 436/518 |

* cited by examiner

METHOD AND APPARATUS FOR FABRICATING REPLICATE ARRAYS OF NUCLEIC ACID MOLECULES

TECHNICAL FIELD

The invention relates generally to the chemical, biological, medical and diagnostic applications of nucleic acid molecules. In particular, the present invention relates to a device for the synthesis and placement of a plurality of discrete nucleic acids in an array on a substrate.

BACKGROUND OF THE INVENTION

An array is a collection of nucleic acid molecules of a chosen length, arranged in a spatially defined and physically addressable manner. Arrays of nucleic acid molecules are used in a variety of screening techniques such as diagnostics, scanning, sequencing and analysis of probes or target molecules, An array of probes such as nucleic acid molecules can be fabricated by depositing the preformed nucleic acid molecules on a substrate, or by forming nucleic acids using in situ synthesis techniques. In nucleic acid sequencing and analysis, there is a growing emphasis on the use of high density arrays of immobilized nucleic acid probes. The arrays can be used to assay for activity against a particular receptor, for screening in drug discovery, for sequencing, and as diagnostics.

Such arrays can be prepared by massive parallel schemes, e.g., using the selective photomask techniques described in U.S. Pat. No. 5,445,934. Arrays constructed in this manner are typically formed on a planar area of between about 4–100 $mm^2$, and can have densities of up to several hundred thousand or more distinct array members/$cm^2$. However, this method is expensive and requires sophisticated equipment. Further, this method requires photomask cells which are four times the nucleic acid probe length. Additionally, the photo-deprotection step is not as efficient as chemical deprotection, thus resulting in lower quality probes.

Conventional in situ synthesis using nanoliter drops can also be used to fabricate arrays, as described in, for example, U.S. Pat. No. 5,474,796 issued to Brennan. However, the number of arrays that can be produced in parallel using this technique is limited. Thus, fabrication of a large number of replicates of the same array is both labor- and time-intensive.

In order to avoid problems inherent in in situ synthesis techniques, polynucleotides can be synthesized prior to attachment to an appropriate substrate. U.S. Pat. Nos. 5,529,756 and 5,472,672, both issued to Brennan, describe an apparatus and a method for polymer synthesis. Preformed nucleic acid molecules can then be deposited on a substrate using several techniques, such as the method described in WO 95/35505 and U.S. Pat. No. 5,807,522. However, synthesis of such polynucleotides is laborious and expensive. Moreover, commercially available DNA synthesizers, such as the ABI 394 DNA Synthesizer, are limited to producing only 4 different oligonucleotides at a time.

Further, the transfer of nucleic acid molecule solutions from the original containers/chambers to the substrate requires a spatial translation from the original format to the final format. This translation is time-intensive and limits the number of parallel transfers possible. For example, WO 95/35505 and U.S. Pat. No. 5,807,522 describe a system to deposit presynthesized materials, wherein a pen-like capillary is used to transfer DNA or c-DNA solutions from a 96 well plate to glass microscope slides. The pen is dipped in the stock solution, and touched on the substrate to spot the liquid on the slide. However, this method has several disadvantages. For instance, the tips must be cleaned before contacting a different probe, and the tips dull easily. Further, the stock solutions are in a different spatial format from that of the actual array. This difference in formats limits the number of parallel transfers, making this process very time-consuming. For example, it would take approximately 50 hours to fabricate 100 arrays of 6000 different probes.

The above problems can be solved in part using robotics. However, current robotic technology can handle only a limited number of samples simultaneously.

Thus, there is a need for an improved apparatus and method to achieve more efficient fabrication of high density arrays, wherein the spatial format of the source of the nucleic acid molecules is similar to the array format, especially when the spatial format of the nucleic acid source is integral to the spatial formation of the deposition system and that of the final array.

SUMMARY OF THE INVENTION

The present method provides an efficient means for arranging an array of nucleic acid molecules onto a substrate. Unlike conventional methods, the present method does not rely on intricate masking/lithographic, protecting, and selective activation techniques to form an array, or labor-intensive methods for applying discrete aliquots of preformed molecules to the substrate. Accordingly, the present invention provides an improved and cost-effective method and device for the fabrication and placement of an array of nucleic acid molecules onto a substrate.

In one aspect, the invention relates to a device for applying an array of nucleic acid molecules onto a substrate, comprising a synthesis unit, and optionally a purification unit and a printing unit. The synthesis unit comprises a plurality of synthesis chambers with corresponding synthesis outlet means, wherein the synthesis chambers are spatially arranged relative to each other to provide an array suitable for conducting parallel nucleic acid syntheses, and wherein the spatial format of the synthesis chambers is integral to the spacial format of the array of nucleic acid molecules on the substrate. Each synthesis chamber may comprise a reactive surface on which nucleic acid molecules are synthesized. For example, the reactive surface can comprise controlled pore glass (CPG) in solution, such as CPG beads in a microtiter well, or in a flow-through format, such as a CPG column or a membrane. Examples of outlet means include, but are not limited to, capillary tubing, any microscaled outlet, pipettes, micropipette tips, inkjet components, pens and the like. The nucleic acid molecules can be directly transferred from the outlet means to a substrate. The outlet means may optionally include partitioning means for separating and/or purifying nucleic acid molecules of different lengths as they pass through the outlet means from the chambers. Further, the synthesis chambers can comprise inlet means which interface with printers or dispensers such as inkjet components or flow-through methodologies, for the introduction of reagents, samples, solutions and the like.

In an alternative embodiment, the invention device further comprises a printing unit wherein the printing unit comprises a plurality of printing chambers with corresponding printing outlet means, and further wherein the spatial format of the printing chambers is correspond to the spacial format of the synthesis unit. The nucleic acid solution is transferred from the synthesis unit into the printing chambers. The nucleic acid solution is then deposited onto the substrate by contacting the printing unit with the substrate. In one embodiment, the printing unit is a rubber stamp or a capillary deposition unit. In a preferred embodiment, the printing unit is an inkjet device.

In another alternative embodiment, the device further comprises a purification unit comprising a plurality of purification chambers with corresponding purification outlet means, wherein the spatial format of the purification chambers corresponds to the spacial format of the synthesis unit. The nucleic acid molecule solution is transferred from the synthesis unit into the purification unit for separation and/or purification of the solution. The purified solution is then transferred into the printing unit and deposited on the substrate as described above.

In another embodiment, the device for applying an array of nucleic acid molecules onto a substrate comprises a synthesis unit, a purification unit, and a printing unit; wherein each of the units is configured as described above.

In another aspect, the invention relates to a method for applying an array of nucleic acid molecules onto a substrate comprising:

(a) providing a device for applying the array of nucleic acid molecules onto a substrate, the device comprising:
 (i) a synthesis unit comprising a plurality of synthesis chambers for containing discrete compositions of nucleic acid molecules, wherein the chambers are spatially arranged relative to each other to provide an array suitable for conducting parallel nucleic acid syntheses;
 (ii) a plurality of outlet means, each of the outlet means communicating with a single synthesis chamber of the synthesis unit and configured such that the nucleic acid molecules can be removed from the chambers through the outlet means, wherein the spatial format of the outlet means corresponds to the spatial format of the synthesis chambers; and (b) treating a reactive surface within each of the synthesis chambers with reagents to yield nucleic acid molecules in the synthesis chambers;

(c) cleaving the nucleic acid molecules off the reactive surface to yield a plurality of discrete compositions of nucleic acid molecules; and (d) depositing the nucleic acid molecules from the chambers onto a substrate in an ordered array that corresponds to the spatial arrangement of the synthesis chambers.

In another embodiment, the method further comprises performing post-synthesis processing of the nucleic acid molecules prior to deposition onto the substrate, for example, by techniques such as purification, desalting, chromatographic separation, and separation/partitioning based on size, charge or specificity.

The nucleic acid molecules can be deposited on the substrate, for example, by direct contact or by use of positive displacement techniques. The nucleic acid molecules can be preformed molecules or assembled in the device and then applied to the substrate. Further, the nucleic acid molecules can be deposited on more than one substrate, wherein each of the substrates comprises more than one array patterns.

These and other embodiments of the present invention will readily occur to those of ordinary skill in the art in view of the disclosure herein.

DETAILED DESCRIPTION

The practice of the present invention will employ, unless otherwise indicated, conventional techniques of chemistry, biochemistry, molecular biology, and medicine, including diagnostics, which are within the skill of the art. Such techniques are explained fully in the literature. See, e.g., *Solid-Phase Synthesis*, Blossey, E. C. and Neckers, D. C. Eds. 1975; Sambrook, Fritsch & Maniatis, *Molecular Cloning: A Laboratory Manual; DNA Cloning*, Vols. I and II (D. N. Glover ed.); *Oligonucleotide Synthesis* (M. J. Gait ed.); *Nucleic Acid Hybridization* (B. D. Hames & S. J. Higgins eds.); and the series, *Methods In Enzymology* (S. Colowick and N. Kaplan eds., Academic Press, Inc.); Beaucage and Carruthers, Tetrahedron Lett., 22:1859–1862 (1981); Matteucci, et al, *J. Am. Chem. Soc.*, 103:3185 (1981); Letsinger, R. L. and Mahadevan, V., *J. Amer. Chem. Soc.*, 88:5319–5324.

All patents, patent applications, and publications mentioned herein, whether supra or infra, are hereby incorporated by reference in their entirety.

A. Definitions

In describing the present invention, the following terms will be employed, and are intended to be defined as indicated below.

It must be noted that, as used in this specification and the appended claims, the singular forms "a", "an", and "the" include plural referents unless the content clearly dictates otherwise. Thus, for example, reference to "a nucleic acid molecule" includes two or more such molecules, "a reagent" includes a mixture of two or more reagents, and the like.

Unless defined otherwise, all technical and scientific terms used herein have the same meaning as commonly understood by one of ordinary skill in the art to which the invention pertains. The following terms are intended to be defined as indicated below.

As used herein, the terms "nucleic acid molecule," "oligonucleotide" and "polynucleotide" refer to nucleic acid molecules including conventional purine or pyrimidine bases as well as base analogs, such as polydeoxyribonucleotides, polyribonucleotides, and to other polymers containing nonnucleotidic backbones, provided that the polymers contain nucleobases in a configuration which allows for base pairing and base stacking, such as is found in DNA and RNA. There is no intended distinction in length between the terms "nucleic acid molecule," "polynucleotide" and "oligonucleotide," and these terms may be used interchangeably.

The term "monomer" as used herein refers to a chemical entity, such as a conventional purine or pyrimidine base as well as base analogs, that may be covalently linked to one or more other entities to form polymers, including oligomers. Suitable oligonucleotides may be prepared by standard procedures, as discussed further below. The length of the nucleic acid molecules used herein, will vary, depending on the intended use of the array. Thus, the length of the molecules can vary from 8 to 50 nucleotides, preferably 12 to 35 nucleotides, and more preferably, 15 to 30 nucleotides.

The term "substrate" is used interchangeably herein with the terms "support" and "solid substrate," and denotes any solid support suitable for immobilizing one or more nucleic acid molecules as discussed further below.

As used herein, the term "array" is defined as a collection of different probes each arranged in a spatially defined and a physically addressable manner. The number of probes or features that can be deposited on an array will largely be determined by the surface area of the substrate, the size of a feature and the spacing between features. Generally, arrays can have a surface area of about 4–2,000 mm$^2$, and can have densities of up to several hundred thousand or more features per cm$^2$, preferably 2,500–200,000 features/cm$^2$.

The term "partitioning means" as used herein, refers to means for postsynthesis processing of nucleic acid molecules of different lengths. Examples of partitioning means include, but are not limited to, modes of purification and/or separation such as desalting, chromatographic separation, and separation based on size, charge or specificity.

The term "reagents" denotes standard materials and chemicals used in the synthesis of nucleic acid molecules, such as monomeric and polymeric nucleotides, phosphorylating agents, protecting groups, activating agents and the like, described further below.

The term "protecting group" as used herein, refers to any of the groups which are designated to block one reactive site in a molecule while a chemical reaction is carried out at another reactive site. More particularly, the protecting groups used herein can be any of those groups described in Green, et al, *Protective Groups in Organic Chemistry*, 2nd Ed., John Wiley & Sons, New York, N.Y., 1991. The proper selection of protecting groups for a particular synthesis will be governed by the overall methods employed in the synthesis. For example, in the synthesis discussed below, the protecting groups will generally be trityl, benzyl, methyl, and include others known to those in the art.

The term "inkjet components" is an example of a deposition system and denotes the use of conventional inkjet printer components which are modified to substitute a solution plotter, preferably a nucleic acid solution, for ink. See, e.g. Wong et al, European Patent Application 260,965 for a description of the use of commercial printers to apply an antibody to a matrix.

The term "integral" as used herein, refers to the spatial format of a given source which is equal to, or a subset of, the final spacial format of the array, such that transfer from one source to another, or to the substrate can be accomplished without a translation or change of the spatial format.

B. General Methods

Before describing the present invention in detail, it is to be understood that this invention is not limited to particular formulations or process parameters as such may, of course, vary. It is also to be understood that the terminology and examples used herein are for the purpose of describing particular embodiments of the invention only, and are not intended to be limiting.

Although a number of compositions and methods similar or equivalent to those described herein can be used in the practice of the present invention, the preferred materials and methods are described.

Figure 1A:
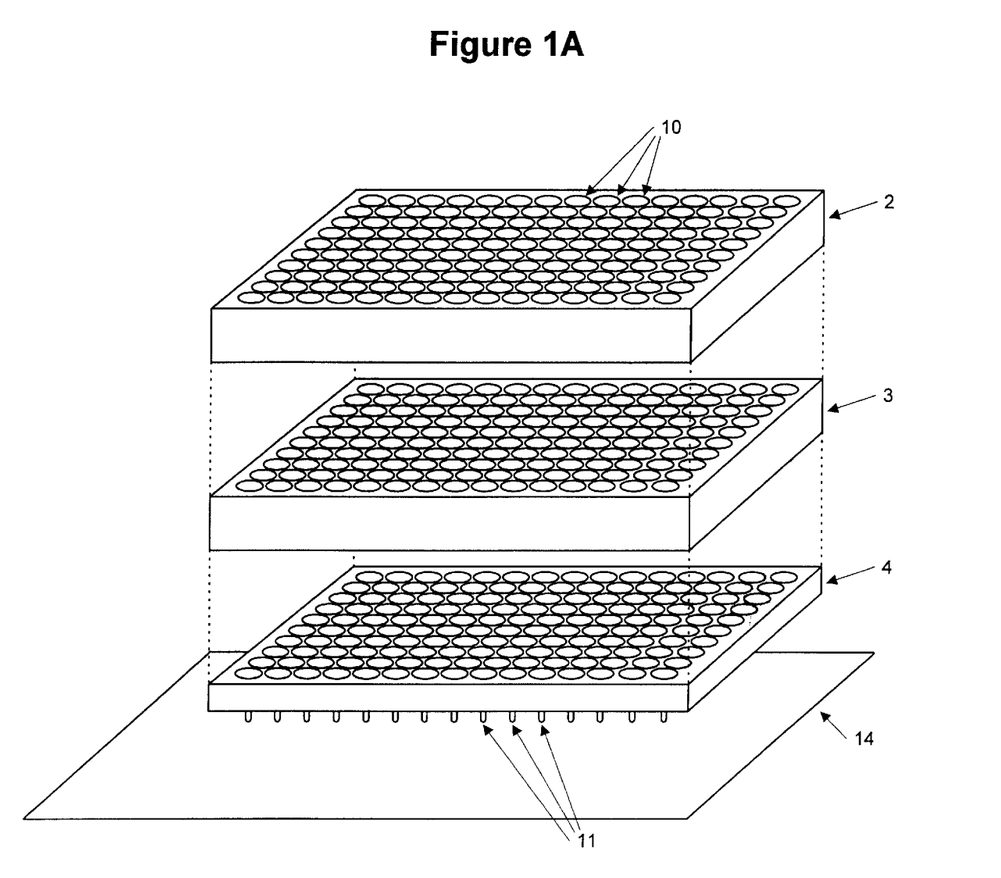
FIG. 1A is a pictorial representation of a device for use in the practice of the methods of the invention comprising a synthesis unit, a purification unit, and a printing unit, and substrate on which the nucleic acid molecules are deposited.

The invention provides a device and a method of using the device to apply nucleic acid molecules to a substrate in an ordered array. FIG. 1A depicts a device 1 of the invention comprising a synthesis unit 2, a purification unit 3, and a printing unit 4; and a substrate 14 on which the nucleic acid molecules are deposited in an ordered array. The substrate may be selected from a wide variety of materials including, but not limited to, fused silica (e.g., glasses), polyamides, polyesters, polyolefins, polypropylene, polytetrafluoroethylene, silicon chips, and the like. Particularly preferred substrates include polystyrene, to which short oligonucleotides, e.g., oligonucleotides ranging from about 8 to about 50 nucleotides in length, may readily be covalently attached (Letsinger et al. (1975) *Nucl. Acids Res.* 2:773–786), as well as polyacrylamide (Gait et al. (1982) *Nucl. Acids Res.* 10:6243–6254), silica (Caruthers et al. (1980) *Tetrahedron Letters* 21:719–722), and controlled-pore glass (Sproat et al. (1983) *Tetrahedron Letters* 24:5771–5774). Suitable substrates may exist, for example, as gels, sheets, tubing, spheres, containers, pads, slices, films, plates, slides, etc. The substrate is preferably flat, but may take on alternative surface configurations. In a preferred mode, the substrate is a flat glass substrate, such as a conventional microscope glass slide, a cover slip and the like.

Figure 1B:
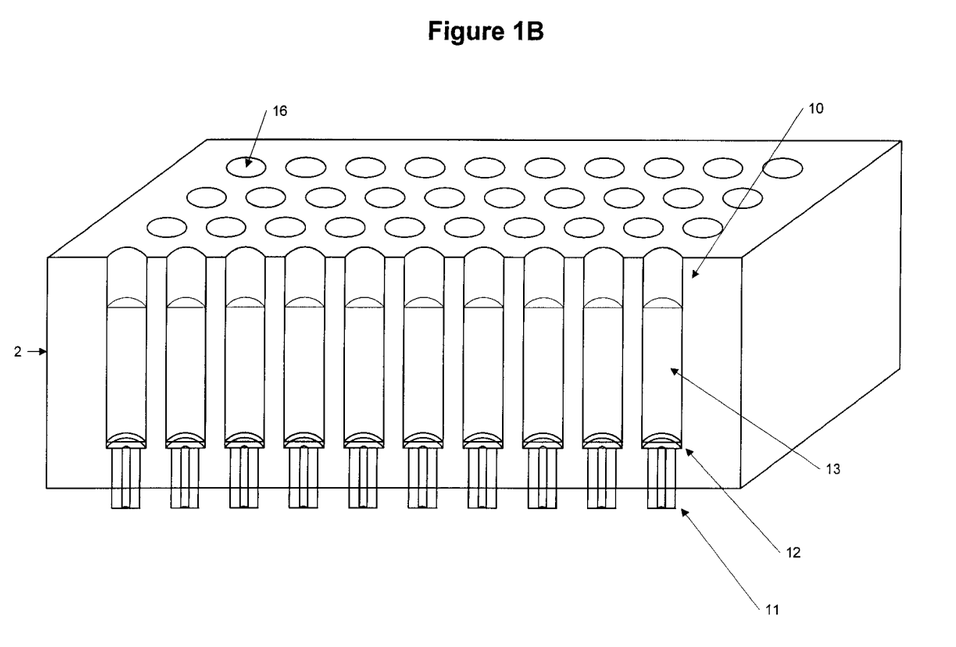
FIG. 1B is a pictorial representation of a synthesis unit comprising reaction chambers which can be used to synthesize the nucleic acid molecules.

As depicted in FIG. 1B, the synthesis unit 2' comprises a plurality of synthesis chambers 10 with corresponding synthesis outlet means 11. The synthesis chamber further comprises an inlet means 16 for receiving reagents, solvents, and gases, and, if required, a suitable filter means 12 disposed therein to retain particulate matter. The inlet means are appropriately designed to allow small volumes of reagent solutions to be applied to the reactive surface 13 within each synthesis chamber 10. In a preferred embodiment, the reagents are added to the inlet means of the synthesis chamber with an inkjet device.

The synthesis chambers 10 can comprise any hollow surface suitable for containing reagents, nucleic acid molecules, reactive surfaces, and the like. The synthesis chambers can be comprised of any suitable material generally used to perform nucleotide synthesis, such as glass or any chemically inert polymeric material. Further, the synthesis chambers 10 can be provided with a lid to facilitate liquid- and pressure-tight fluid communication throughout the chamber using, e.g., a threaded cap, or a stopper. Additionally, the synthesis chambers 10 can be spatially arranged relative to each other to provide an array suitable for conducting parallel nucleic acid syntheses. In this regard, the chambers may be arranged in a variety of formats, for example, square, rectangular, circular or random. For clarity, only 10 chambers in each row of synthesis unit are depicted, but any array format and size may be constructed. In a preferred embodiment, the synthesis chamber comprises small wells in a plate, as depicted in FIG. 1B, such as a 1536-well microtiter plate.

In another embodiment, the synthesis chamber 10 comprises a reactive surface 13 on which nucleic acid molecules may be synthesized. For example, suitable reactive surfaces can be comprised of any of the standard DNA synthesis support materials, such as CPG, beads, polystyrene, membranes, microtiter wells, strings, gels, plastic strips, resins and the like, wherein a bead includes any type of solid or hollow surface such as a sphere, ball, cylinder, bearing or related configuration composed of plastic, glass, latex, ceramic, magnetic materials, TEFLON, polymers or the like.

In a preferred embodiment, the reactive surface is controlled pore glass (CPG) in solution, such as CPG beads in a microtiter well, or in a flow-through format, such as a CPG column. The filter means 12 physically retains the reactive surface 13, while allowing the flow of solvents, reagents, and nucleic acid molecules that have been cleaned or otherwise dislodged from the reactive surface. Appropriate filter means include a membrane, or a screen or a frit comprised of any chemically inert material, such as stainless steel, glass, polyethylene, polytetrafluoroethylene and the like.

As illustrated in FIG. 1A and 1B, the synthesis outlet means 11, which are attached to each synthesis chamber 10, can also be spatially arranged relative to each other such that nucleic acid molecules can be removed from the synthesis chambers through the synthesis outlet means and deposited onto the substrate 14 in an ordered array that corresponds to the spatial arrangement of the synthesis chambers. Examples of synthesis outlet means include, but are not limited to, capillary, tubing or pipettes, any micro-scaled outlet, pipettes, or micropipette tips. If desired, the synthesis outlet means can further comprise positive displacement techniques, such as capillary action and the like.

Further, the synthesis outlet means has a small diameter such that the reagent and the nucleic acid solutions will remain within the synthesis chamber until a differential pressure is applied across the inlet and outlet means. This differential pressure can be created either by positive pressure on the inlet side or a vacuum on the outlet side. During synthesis, all reagents are diverted to a waste system. After synthesis, the nucleic acid molecules are cleaved from the reactive surface 13 and the nucleic acid molecule solution is transferred to the printing unit 4, by applying differential pressure to the synthesis chamber. The entire array or a subset of the array of the synthesized nucleic acid molecules can be transferred to a printing unit 4 comprising an array of printing chambers, wherein the spacing of the printing chambers corresponds to the spacing of the synthesis unit.

Figure 1C:
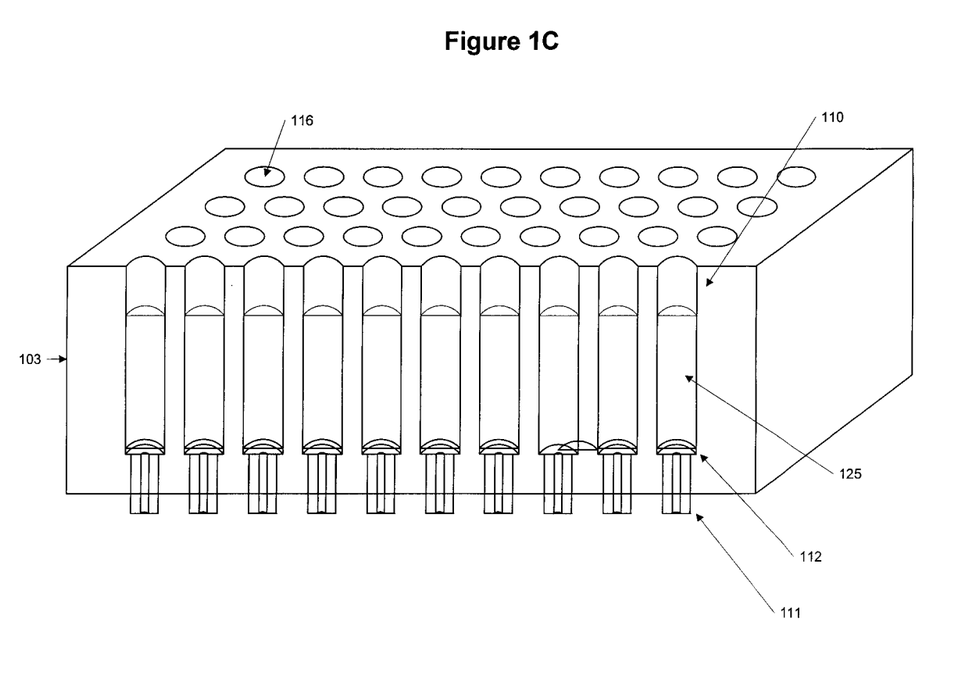
FIG. 1C is a pictorial representation of a purification unit for postsynthesis processing of the nucleic acid molecules.
Figure 1D:
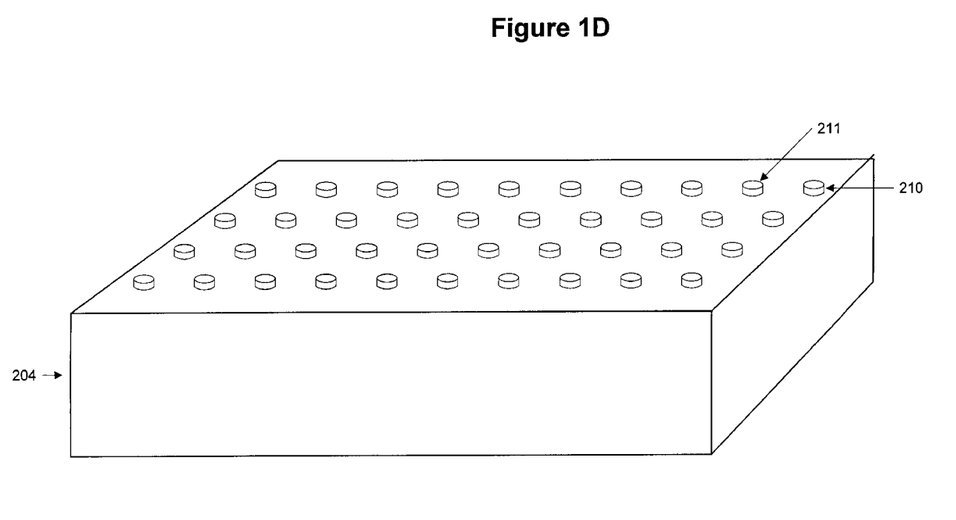
FIG. 1D is a pictorial representation of a rubber stamp applicator for depositing nucleic acid molecules onto the substrate.

FIG. 1D shows one embodiment of the printing unit 204 designed like a rubber stamp, wherein the relief of the rubber stamp is fabricated to match the format of the outlet capillaries on the synthesis unit 2'. The cleaved nucleic acid molecule solution is deposited onto the printing unit 204 by controlling the differential pressure. The nucleic acid molecule solution is transferred onto the substrate by contacting the printing unit 204 with the substrate, and the printing process is repeated until the solution is exhausted from the printing unit.

Figure 1E:
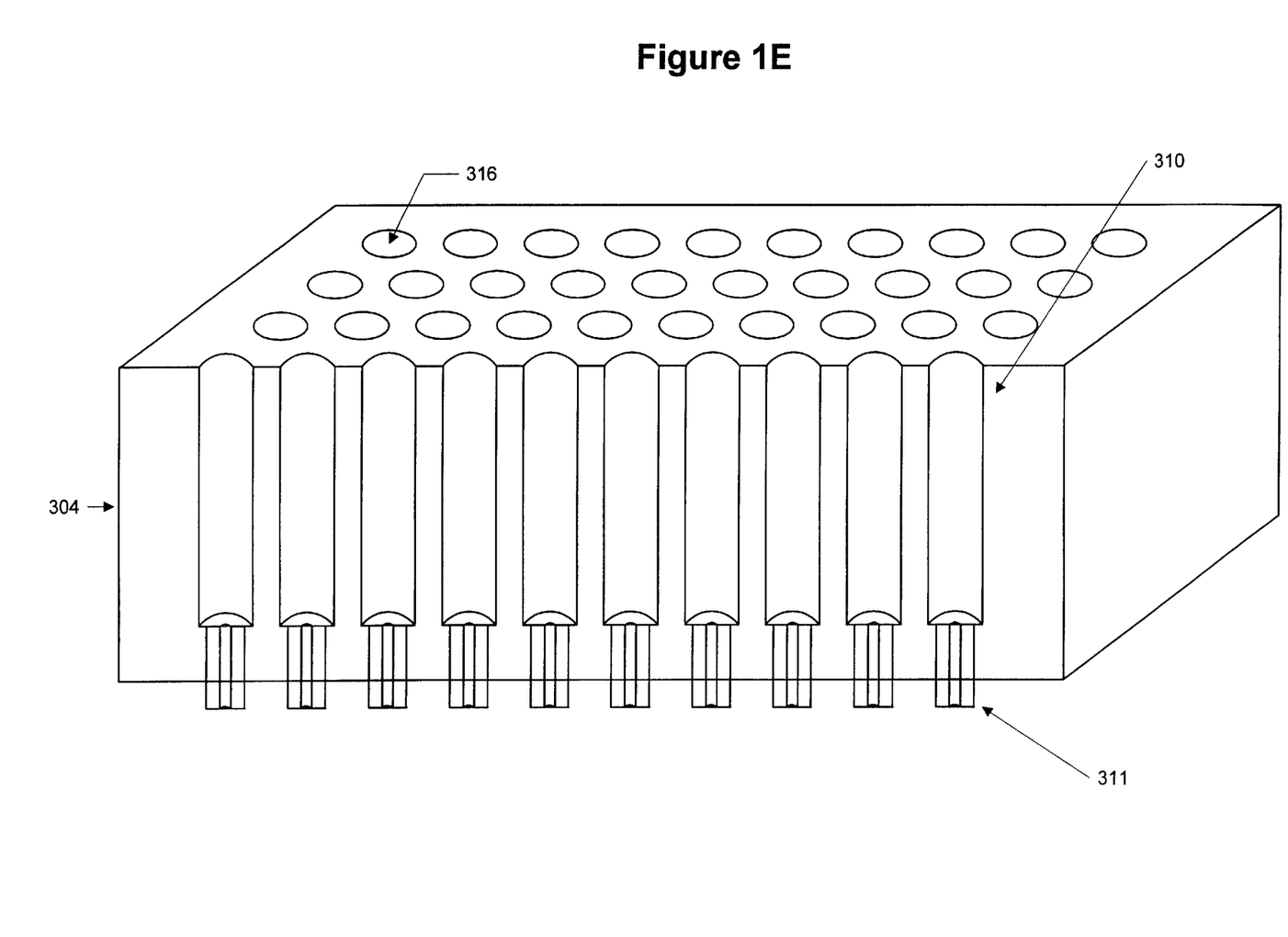
FIG. 1E is a pictorial representation of a capillary deposition unit.

In another embodiment, as illustrated in FIG. 1E, the printing unit is a capillary deposition unit 304 and comprises an array of printing chambers 310 with an inlet 316 to allow the transfer of nucleic acid molecule solutions from the synthesis unit 2 into the printing chamber 310, a reservoir area to contain enough volume for printing the required number of replicate arrays, and a capillary outlet 311 designed to transfer the solution from the reservoir area of the printing chamber 310 to the printing outlet. The capillary then forms a liquid drop such that the printing unit can be positioned close to the surface of the array substrate to allow the drop to transfer. When the printing unit 304 is moved away from the substrate, another drop forms at the end of the capillary and the printing process is repeated.

The final array spacing can be more dense than the spacing used for fabricating or dispensing the solutions. For example, if the spacing between the synthesis chambers is 2 mm and the capillary or rubber stamp spot size is 100 microns, a 10×10 array comprising 100 features would require an area 20 mm on each side. For a second through fifth operation, the outlet means is positioned an additional one fifth of the spacing between features or 0.4 mm in one direction of the array, resulting in 400 additional features on the array. The dispensing operations can be repeated such that the outlet means moves 0.4 mm in the orthogonal direction from the original position; resulting in an array comprising 2500 features in 400 $mm^2$ total area.

In another preferred embodiment, the nucleic acid molecule solution is transferred to an inkjet printing device, wherein the spacing of the inlet of the inkjet nozzle matches the spacing of the synthesis outlet means 11 on the synthesis unit 2'. The solution is transferred to the individual reservoir of the inkjet head by applying differential pressure to the synthesis chamber, followed by priming of the inkjet chambers by applying vacuum to the outlet nozzle. Capillary forces allow the solutions to move to the nozzle but stop at the opening. Once the inkjet is loaded, the inkjet head is test-fired and then scanned over the substrates and the individual solutions are deposited into position.

In another embodiment, the nucleic acid molecules are optionally purified before deposition, using various techniques known in the art. The nucleic acid molecule solution is transferred from the synthesis unit to the purification unit or the partitioning means for post-synthesis processing. For example, tritylated nucleic acid molecules can be purified by reverse-phase column chromatography, such that the protected nucleic acid molecules are retained on the column, subsequently deprotected and eluted off the column to yield the purified nucleic acid molecule solution. The purified solution is then deposited onto the substrate as described above.

As illustrated in FIG. 1C, the purification unit 103 comprises an array of purification chambers 110 with an inlet 116 to allow the transfer of nucleic acid molecule solutions from the synthesis unit 2 into the purification chamber 110 and a purification outlet means 111 designed to transfer the purified solution from the purification chamber 110 to the printing unit 4. The purification chamber 110 further comprises purification means 125, such as reverse phase chromatography, HPLC and the like.

Figure 2:
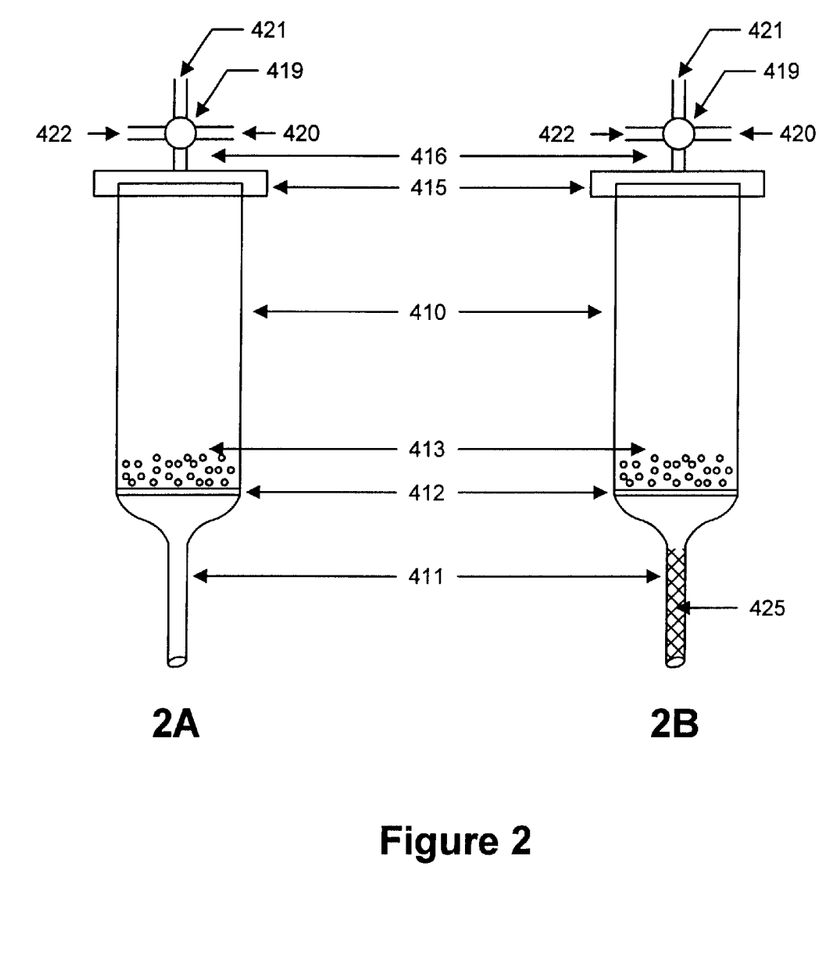
FIG. 2A is a pictorial representation of a reaction chamber of the synthesis unit which can be used to synthesize the nucleic acid molecules.
FIG. 2B is a pictorial representation of an alternative embodiment of reaction chamber, wherein the outlet means further comprise partitioning means.

Referring now to FIGS. 2A and 2B, the synthesis outlet means optionally include partitioning means 425 for separating and/or purifying nucleic acid molecules of different lengths as they pass through the synthesis outlet means 411 from the synthesis chamber 410. Appropriate partitioning means can include, for example, means for desalting, chromatographic separation, and for separations based on size, charge or specificity.

In the embodiment illustrated in FIGS. 2A and 2B, each synthesis chamber 410 comprises inlet means 416 for the introduction of reagents, samples, solutions and reactive surfaces 413 into the synthesis chamber. The inlet means can be comprised of multiple components, as depicted. Specifically, the inlet means can comprise a multi-position valve 419, which switchably connects conduits 420, 421, and 422 to inlet means 416, to facilitate the introduction of reagents, solvents, and gases into the synthesis chamber 410. Further, either of the conduits 420–422 can be used to create a vacuum or apply pressure to the synthesis chamber. Suitable gases for applying pressure include air, and inert gases generally used in syntheses, such as nitrogen, argon, helium, and the like. In some embodiments the reaction solutions pass through the synthesis chamber under the influence of gravity, while in other embodiments, the fluid flow within the synthesis chamber is achieved by vacuum or pressure. In a preferred embodiment, the inlet means comprise inkjet component or flow-through methodologies.

The invention also pertains to a method for applying an array of nucleic acid molecules onto a substrate. The nucleic acid molecules can be deposited onto the substrate, for example, by direct contact or by positive displacement techniques, as described above. In one embodiment, preformed nucleic acid molecules are contained in the device and applied onto a substrate in an ordered array. As seen in FIG. 1D and 1E, in a preferred embodiment, rubber posts 211 or capillaries 311 are attached to the bottom of the printing unit 204 and 304 respectively, are contacted with the substrate to deposit a small (nanoliter) volume of nucleic acid molecules from the printing unit onto the substrate. The nucleic acid molecules may react immediately on contact with the substrate or may require further activation steps, such as the addition of a catalyst, or another activating reagent. The chemistry to covalently couple compounds with the same or different functional groups, such as coupling polymer-coated solid supports with activated oligonucleotides, is well known in the art. See, e.g. Ji, *Method. Enzymol.*, 91:580–609 (1983); and U.S. Pat. No. 5,667,976.

In another embodiment, the nucleic acid molecules are assembled in the device and then applied to the substrate. The synthesis of nucleic acid molecules comprises first reacting the nucleotide monomers and reagents, preferably using a reactive surface 13 disposed within the synthesis chamber 10 (FIG. 1B) to yield the nucleic acid molecules, followed by cleaving the molecules from the reactive surface to yield a composition of nucleic acid molecules. First, the reactive surface is activated using an appropriate activating agent. A first monomer is bound to the reactive surface, deprotected using standard deprotecting reagents and coupled with a second monomer to yield a dimer. The first and/or second group of monomers may or may not be homogenous. This step is optionally followed by washing to remove excess reagents. In the second step, additional reagents are added to the synthesis chamber, providing for iterative coupling of additional monomers to the first group of dimers. This process of deprotection and coupling is repeated until a diverse set of polymeric nucleic acid molecules of desired sequence and length is formed on the reactive surface. The nucleic acid molecules are then cleaved from the reactive surface to yield a composition of nucleic acid molecules. PCT application WO 85/01151 describes a method for synthesizing oligonucleotides tethered to a CPG column. Oligonucleotides can be synthesized by standard procedures. See, e.g., U.S. Pat. No. 5,667,976; U.S. Pat. No. 5,700,637; Edge, *Nature*, 292:756 (1981); Nambiar et al., *Science*, 223:1299 (1984); Jay et al., *J. Biol. Chem.*, 259:6311 (1984); Beaucage and Carruthers, *Tetrahedron Lett.*, 22:1859–1862 (1981); and Matteucci, et al, *J. Am. Chem. Soc.*, 103:3185 (1981).

The method further includes post-synthesis processing of the nucleic acid molecules, for example, using purification techniques such as desalting, chromatographic separation, including reverse phase chromatography and HPLC, and separation based on size, charge or specificity. In a preferred embodiment, the length of the molecules can vary from 8 to 50 nucleotides, more preferably 12 to 35 nucleotides, and most preferably, 15 to 30 nucleotides.

Further, the nucleic acid molecules can be deposited onto the substrate, for example, by direct contact or by using positive displacement techniques as described above. Additionally, the nucleic acid molecules can be deposited on more than one substrate.

Referring now to FIG. 1B, in a preferred embodiment, the synthesis unit 2' comprises a plurality of synthesis chambers 10. Each synthesis chamber may further contain a bead such as a CPG bead, a glass bead, one formed from silica gel, and a nylon bead, which serves as a reactive surface for polymer synthesis. The synthesis chamber serves as a container for the reagents. Selected reagents are applied to the well, the nucleic acid molecules are synthesized base by base, and then cleaved from the bead to form a solution of the nucleic acid molecules. Preferably, the beads are spherical in shape, with a diameter from about 50 microns to about 500 microns, more preferably from about 100 microns to about 120 microns. If desired, the beads can be activated using, e.g., 3-aminopropyl-triethoxysilane, and the resulting aminopropyl-CPG, silica or glass bead is further reacted with cyanuric chloride or a derivative thereof. The bead is then reacted with a polymer coat, and then treated with appropriate reagents to allow oligonucleotide synthesis. See, e.g., U.S. Pat. No. 5,667,976. A microcapillary 11 attached to the bottom of each synthesis chamber is used to store or drain the reagents and to contain the nucleic acid solution. The nucleic acid molecules are deposited on the substrate, in the same spatial format or pattern of the synthesis chamber, by contacting the bottom of the synthesis unit onto the substrate. This contact-printing can be repeated for a large number of different substrates to fabricate numerous replicates of the same array. Further, the nucleic acid molecules can be deposited on more than one substrate, wherein each substrate can have one or more array patterns.

In another embodiment, nucleic acid solutions, synthesized as described above, are transferred to the printing unit for deposition. Alternatively, nucleic acid solutions are transferred to a purification unit for post-synthesis processing prior to deposition.

In an additional embodiment, in situ synthesis methods are performed, using the device to assemble the nucleic molecules directly on the substrate in an ordered array. An illustrative example of this method is described in U.S. Pat. No. 5,700,637. The first set of nucleic acid molecules is deposited using contact-printing on the substrate. The nucleic acid molecules may react immediately on contact with the substrate or may require further activation steps, such as the addition of a catalyst, or another activating reagent. As mentioned above, the chemistry to covalently couple compounds with the same or different functional groups, such as coupling polymer-coated solid supports with activated oligonucleotides, is well known in the art. See, e.g. Ji, *Method. Enzymol.*, 91:580–609 (1983); and U.S. Pat. No. 5,667,976. This step is optionally followed by washing to remove excess reagents. The second layer is then laid down on this first layer by contact-printing with a different solution of nucleic acid molecules. This process is repeated until the desired assembly of nucleic acid molecules is obtained.

In an alternative method, as described in U.S. Pat. No. 5,677,195, a first monomer solution is deposited on a first region of a suitably derivatized substrate, a second monomer solution is then deposited on a second region of the substrate, and so on. This process is repeated until the desired level of deposition is achieved. These monomers are then reacted with the substrate, followed by washing and subsequent preparation of the substrate for a new set of monomers. This process is repeated until polymers of desired length and sequence are obtained.

In another embodiment, the apparatus for contact-printing is used to deposit small volumes (nanoliters) of any solution transferred into the wells. In this range, standard liquid transfer techniques, such as a disposable pipette tips, positive displacement and the like, can be employed.

The following examples are illustrative in nature, and are not intended to limit the scope of the present invention in any manner.

EXAMPLE 1

Synthesis of nucleic acid molecules is carried out in the reaction chambers of the present device in numerous ways. Illustrative is a method described by Zubay, G. L. in *Biochemistry*, 772–773, (Benjamin/Cummings Publishing Company, Inc., 1996). Generally, a phosphodiester bond between two nucleotides is formed by activation of a protected nucleotide, such as a monoester of a 5'-nucleotide, followed by reaction with a 3'-OH on another nucleotide. Alternatively, the monoester of a 3'-nucleotide can be activated and reacted with a 5'-OH on another nucleotide. Successive phosphorylation followed by activation and condensation using protected dinucleotides yields polymers of the desired chemical sequence. When the desired polymer has been synthesized, it is cleaved from the support. Several other methods can be used to synthesize oligonucleotides. See, Letsinger, R. L. and Mahadevan, V., *J. Amer. Chem. Soc.*, 88:5319–5324; *Solid-Phase Synthesis*, Blossey, E. C. and Neckers, D. C. Eds. 1975.

The activating agents generally used include mesitylenesulfonyl chloride, triisopropylbenzenesulfonyl chloride (TPS) and triisopropylbenzenesulfonyl tertazolide (TPSTe).

EXAMPLE 2

Another example of oligonucleotide synthesis using the device of the invention is as described in U.S. Pat. No. 55,700,637. Suitable nucleic acid molecules may be prepared by the phosphoramidite method as described by Beaucage and Carruthers, *Tetrahedron Lett.*, 22:1859–1862 (1981), or by the triester method according to Matteucci, et al, *J. Am. Chem. Soc.*, 103:3185 (1981). The coupling solution, which comprises protected monomers and a deprotecting reagent is reacted on the reactive surface within the chamber, to yield a stable phosphotriester bond. The 5' end is deprotected and further reacted with the desired monomer to extend the nucleotide chain. This process is repeated until the desired polymer sequences has been synthesized. After the synthesis is completed, the oligonucleotide is deprotected.

EXAMPLE 3

A method for using the device of the invention is described below. The nucleic acid molecules are synthesized according to any one of the methods described in Examples 1 and 2 above, and then applied to the substrate. Specifically, a microtiter plate having 1536 wells, wherein each well contains a CPG reactive surface. The oligonucleotide synthesis is carried out on the bead as described in Examples 1 and 2 above. When the desired length is achieved, the molecules are cleaved from the bead to form a solution of the nucleic acid molecules. A microcapillary attached to the bottom of each well is used to store or drain the reagents and to contain the nucleic acid solution. A small volume of the nucleic acid solution is deposited on a microscope slide, in the pattern of the wells by touching the bottom of the plate on the substrate. The capillary is refilled by capillary action from the well. This contact-printing is repeated for a large number of different substrates to fabricate numerous replicates of the same array.

Thus, an apparatus and a method for applying an array of nucleic acid olecules onto a substrate is disclosed. Although preferred embodiments of the nvention device have been described in some detail, it is understood that obvious riations can be made without departing from the spirit and scope of the vention as defined by the appended claims.

We claim:

1. A device for applying an array of nucleic acid molecules onto a substrate, said device comprising:
    (a) a synthesis unit comprising a plurality of synthesis chambers for containing discrete compositions of nucleic acid molecules, wherein the synthesis chambers are spatially arranged relative to each other to provide an array suitable for conducting parallel nucleic acid syntheses; and
    (b) a plurality of synthesis outlet means, each of said synthesis outlet means communicating with a single synthesis chamber of said synthesis unit and configured such that the nucleic acid molecules can be removed from said chambers through said synthesis outlet means and deposited onto the substrate without a change in the spatial arrangement in an ordered array that corresponds to the spatial arrangement of the synthesis chambers; and
    (c) a purification unit in communication with the synthesis unit, wherein the purification unit comprises a plurality of purification chambers with corresponding purification outlet means in a spatial format, and further wherein the spatial format of the purification chambers is integral with the spatial arrangement of the synthesis unit, such that the synthesized nucleic acid molecules can be transferred to the purification unit without a change in the spatial arrangement.

2. The device of claim 1, wherein each of said synthesis chambers further comprises inlet means.

3. The device of claim 2 wherein the inlet means are comprised of a combination of inkjet components or flow-through methodology.

4. The device of claim 2, wherein the synthesis chambers further comprise a reactive surface on which nucleic acid molecules may be synthesized.

5. The device of claim 4, wherein the reactive surface comprises controlled pore glass (CPG).

6. The device of claim 1, wherein the synthesis outlet means further comprise partitioning means for separating the nucleic acid molecules of different lengths as they pass through the outlet means from the synthesis chambers.

7. The device of claim 1, wherein the outlet means comprise a plurality of microcapillaries, disposable pipette tips or positive displacement techniques.

8. The device of claim 1 further comprising a printing unit in communication with the synthesis unit, wherein the printing unit comprises a plurality of printing chambers with corresponding printing outlet means in a spatial format, and further wherein the spatial format of the printing chambers is integral with the spatial arrangement of the synthesis unit, such that the synthesized nucleic acid molecules can be transferred to the printing unit without a change in the spatial arrangement.

9. The device of claim 8, wherein the printing unit is a rubber stamp, an inkjet device or a capillary deposition unit.

10. The device of claim 8, wherein the printing unit is an inkjet device.

11. The device of claim 8 further comprising means for moving the printing unit toward and away from the substrate.

12. The device of claim 8 wherein the purification unit performs a desalting, chromatographic separation, a separation based on charge or specificity, or a separation of nucleic acid molecules of different lengths.

13. The device of claim 1 wherein the purification chamber comprises a reverse phase chromatography column.

14. The device of claim 1 wherein the purification unit performs a desalting, chromatographic separation, a separation based on charge or specificity, or a separation of nucleic acid molecules of different lengths.

15. A device for applying an array of nucleic acid molecules onto a substrate, said device comprising:

(a) a synthesis unit;

(b) a purification unit; and (c) a printing unit;

wherein the synthesis unit comprises a plurality of synthesis chambers each having a synthesis outlet means, and wherein the synthesis chambers are spatially arranged relative to each other to provide an array suitable for conducting parallel nucleic acid syntheses and each of said synthesis outlet means communicates with a single synthesis chamber and is configured such that nucleic acid molecules can be removed from said synthesis chambers through said synthesis outlet means and transferred to the purification unit without a change in the spatial arrangement;

and further wherein the purification unit comprises a plurality of purification chambers each having a purification outlet means in a first spatial format, wherein the spatial format of the purification chambers is integral with the spatial arrangement of the synthesis unit, and wherein each of said purification outlet means communicates with a single purification chamber and is configured such that purified nucleic acid molecules can be removed from said purification chambers through said purification outlet means and transferred to the printing unit without a change in the spatial format;

and further wherein the printing unit comprises a plurality of printing chambers each having a printing outlet means in a second spatial format, wherein the spatial format of the printing chambers is integral with the spatial arrangement of the synthesis unit and the spatial format of the purification unit, and wherein each of said printing outlet means communicates with a single printing chamber and is configured such that the purified nucleic acid molecules can be removed from said printing chambers through said printing outlet means and deposited onto a substrate without a change in either spatial formats in an ordered array that corresponds to the spatial arrangement of the synthesis chambers.

16. The device of claim 15 wherein the purification unit performs a desalting, chromatographic separation, a separation based on charge or specificity, or a separation of nucleic acid molecules of different lengths.

17. A method for applying an array of nucleic acid molecules onto a substrate comprising:

(a) providing a device for applying said array of nucleic acid molecules onto a substrate, said device comprising:

(i) a synthesis unit comprising a plurality of synthesis chambers for containing discrete compositions of nucleic acid molecules, wherein the synthesis chambers are spatially arranged relative to each other to provide an array suitable for conducting parallel nucleic acid syntheses;

(ii) a plurality of outlet means, each of said outlet means communicating with a single synthesis chamber of said synthesis unit and the plurality of outlet means configured in a spatial format such that the nucleic acid molecules can be removed from said chambers through said outlet means, wherein the spatial format of the outlet means is integral with the spatial arrangement of the synthesis chambers; and (b) treating a reactive surface within each of said synthesis chambers with reagents to yield the nucleic acid molecules in the synthesis chambers;

(c) cleaving said nucleic acid molecules off the reactive surface to yield a plurality of discrete compositions of the nucleic acid molecules; and (d) depositing the nucleic acid molecules from the chambers onto a substrate without a change in the spatial format in an ordered array that corresponds to the spatial arrangement of the synthesis chambers;

the method further comprising performing post-synthesis purification of the nucleic acid molecules without a change in spatial format prior to deposition onto the substrate.

18. The method of claim 17, wherein the post-synthesis purification comprises a chromatographic separation, a separation based on charge or specificity, or a separation of nucleic acid molecules of different lengths.

19. The method of claim 18, wherein the nucleic acid molecules are deposited onto the substrate by direct contact or positive displacement techniques.

20. The method of claim 19, wherein the nucleic acid molecules are deposited on more than one substrate.

21. The method of claim 20 wherein each of said substrates comprise more than one array patterns.

22. The method of claim 17 wherein the spatial arrangement of the synthesis chambers is integral with that of the array.

23. The method according to claim 17 wherein the depositing of step (d) is performed by a printing unit with outlets, the method additionally comprising the steps of moving the printing unit a distance which is less than the spacing of the outlets and repeating step (d) so that the final array spacing is more dense than the spacing of the outlets.

24. A method for applying an array of nucleic acid molecules onto a substrate comprising:

(a) providing a device for applying said array of nucleic acid molecules onto a substrate, said device comprising:

(i) a synthesis unit comprising a plurality of synthesis chambers for containing discrete compositions of nucleic acid molecules, wherein the synthesis chambers are spatially arranged relative to each other to provide an array suitable for conducting parallel nucleic acid syntheses;

(ii) a plurality of outlet means, each of said outlet means communicating with a single synthesis chamber of said synthesis unit and the plurality of outlet means configured in a spatial format such that the nucleic acid molecules can be removed from said chambers through said outlet means, wherein the spatial format of the outlet means is integral with the spatial arrangement of the synthesis chambers; and (b) treating a reactive surface within each of said synthesis chambers with reagents to yield the nucleic acid molecules in the synthesis chambers;

(c) cleaving said nucleic acid molecules off the reactive surface to yield a plurality of discrete compositions of the nucleic acid molecules; and (d) depositing the nucleic acid molecules from the chambers onto a substrate without a change in the spatial format in an ordered array that corresponds to the spatial arrangement of the synthesis chambers;

wherein the treating of step (b) comprises: (i) deprotecting a protected monomer coupled to the surface, (ii) adding an additional protected monomer to the synthesis chamber to couple to the deprotected monomer, and (iii) repeating steps (i) and (ii) to yield the nucleic acid molecules;

the method further comprising performing post-synthesis purification of the nucleic acid molecules without a change in spatial format prior to deposition onto the substrate.

25. The method of claim 24, wherein the post-synthesis purification comprises a chromatographic separation, a separation based on charge or specificity, or a separation of nucleic acid molecules of different lengths.

26. The method of claim 24 wherein the depositing is performed by an inkjet device.

27. The method of claim 24 wherein the spatial arrangement of the synthesis chambers is integral with that of the array.

28. The method of claim 24 wherein the depositing of step (d) is performed by a printing unit with outlets, the method additionally comprising the steps of moving the printing unit a distance which is less than the spacing of the outlets and repeating step (d) so that the final array spacing is more dense than the spacing of the outlets.

29. The method of claim 24 wherein the treating step additionally comprising washing to remove excess reagents following addition of the additional protected monomer to the synthesis chamber to couple to the deprotected monomer.

* * * * *